United States Patent [19]

Smith

[11] Patent Number: 4,541,874
[45] Date of Patent: Sep. 17, 1985

[54] VEHICLE SCRUBBING APPARATUS

[76] Inventor: Judson L. Smith, 5432 Lighthouse La., Tempe, Ariz. 85283

[21] Appl. No.: 657,083

[22] Filed: Oct. 3, 1984

[51] Int. Cl.$^4$ ............................................. B60S 3/06
[52] U.S. Cl. ...................................... 134/6; 15/97 B; 15/DIG. 2
[58] Field of Search ............... 15/97 B, DIG. 2, 53 R, 15/53 A, 53 AB; 134/6

[56] References Cited

U.S. PATENT DOCUMENTS 3,510,898 5/1970 Tatara et al. .................... 15/97 B X
3,914,818 10/1975 Fromme ............................. 15/97 B
3,931,658 1/1976 Evans ............................... 15/97 B X Primary Examiner—Edward L. Roberts
Attorney, Agent, or Firm—Woodard, Weikart, Emhardt & Naughton

[57] ABSTRACT

An overhead frame supports a gear housing which supports a strip support frame from which flexible cleaning strips are hung. A motor driving a main shaft to which the housing is connected moves the strip support frame in a circular path about a first axis over the top of a vehicle while the strips contact the body of the vehicle for the scrubbing action. As the strip support frame is moved in the circular path, it is positively moved about a second axis parallel to the first and in a direction opposite the direction of movement in the path. The strip frame is rotatably mounted on an inclined portion of a second shaft whose main portion is on the second axis, so the strip support frame is rotatable on a third axis which is inclined with respect to the first and second axes. Rotation of the shaft having the inclined portion is provided by a gear coupling to a stationary gear in the rotating housing. Therefore, as the main shaft is rotated to provide the movement of the support frame in a circular path, the second shaft is rotated in an opposite direction and, with the support frame on an inclined portion of that shaft, a resulting positive vertical action of the scrubbing strips is achieved.

8 Claims, 4 Drawing Figures

U.S. Patent  Sep. 17, 1985  Sheet 1 of 2  4,541,874

VEHICLE SCRUBBING APPARATUS

BACKGROUND OF THE INVENTION

1. Field of the Invention

This invention relates generally to vehicle washing, and more particularly to a powered rotating array of fabric strips hanging from an overhead structure and operating to scrub the surface of a vehicle.

2. Description of the Prior Art

The closest prior art known to us is an apparatus marketed by the owner of this application under the mark Roto-Flex. In that apparatus, a fixed overhead frame supported a first vertical shaft at the center of the frame and above the center of the path of a vehicle (typically an automobile) through the apparatus. A horizontally extending arm affixed to the lower end of the first shaft supported a second vertical shaft which was rotatable in the arm. A sprocket was mounted to the upper end of the second shaft, and a horizontally extending circular frame was mounted to the lower end of that shaft, the diameter of the circular frame being approximately the diameter of the widest vehicle to be scrubbed. An array of fabric strips was hung from the circular frame and extended down to a level near the floor of the carwash installation. A second sprocket was affixed to the overhead frame concentric with the first shaft.

A chain extended around both sprockets. A drive motor was secured to the overhead frame and coupled by belt drive to the first mentioned shaft. This motor rotated the first shaft and thus rotated the arm about the first shaft axis. Although the sprocket at the end of the second shaft was free to rotate in its bearing in the arm, the other sprocket secured to the frame was fixed. Consequently, as the motor rotated the arm, the chain drive caused the circular frame to rotate relative to the arm in the opposite direction. The result was a movement of the circular frame in a circular path about the first shaft axis, and rotation of the circular frame and fabric strips about the second shaft in the opposite direction. This resulted in cleaning front and rear contours of the vehicle as well as windows and upper horizontal surfaces, by the hanging strips.

While the above described system performed very effectively, vertical scrubbing action other than that accidentally achieved due to movement of the fabric strips over the various contours of the vehicle, was desired. The present invention is directed to that objective.

SUMMARY OF THE INVENTION

Described briefly, according to a typical embodiment of the present invention, an overhead frame supports a strip support frame from which flexible cleaning strips are hung. The strip support frame is moved in a circular path about a first axis over the top of a vehicle while the strips contact the body of the vehicle for the scrubbing action. As the strip support frame is moved in the circular path, it is positively moved about a second axis parallel to the first and in a direction opposite the direction of movement in the path. The strip frame is rotatably mounted on a third axis which is inclined with respect to the first and second axes. Therefore, as the support frame is moved in a circular path, it is rotated in an opposite direction and, with the support frame on an inclined axis, a resulting positive vertical action of the scrubbing strips is achieved.

DESCRIPTION OF THE PREFERRED EMBODIMENT

Figure 1:
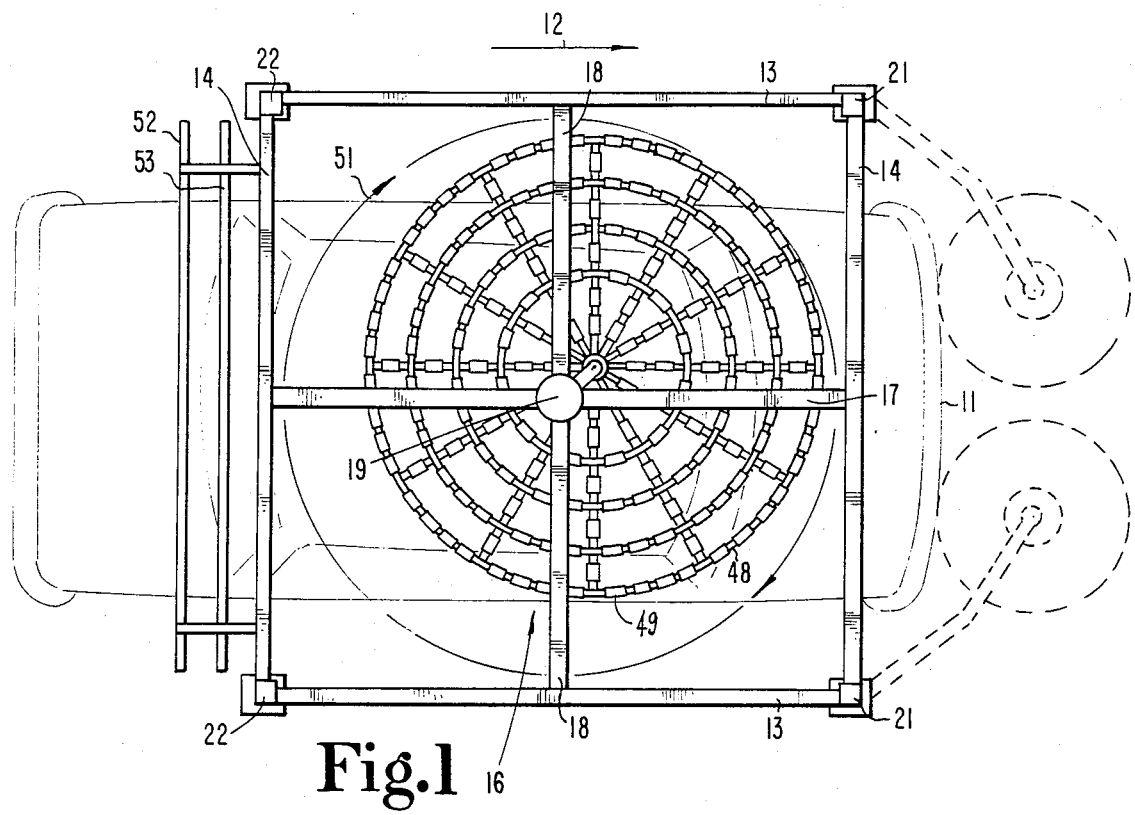
FIG. 1 is a top plan view of a vehicle scrubbing apparatus, according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
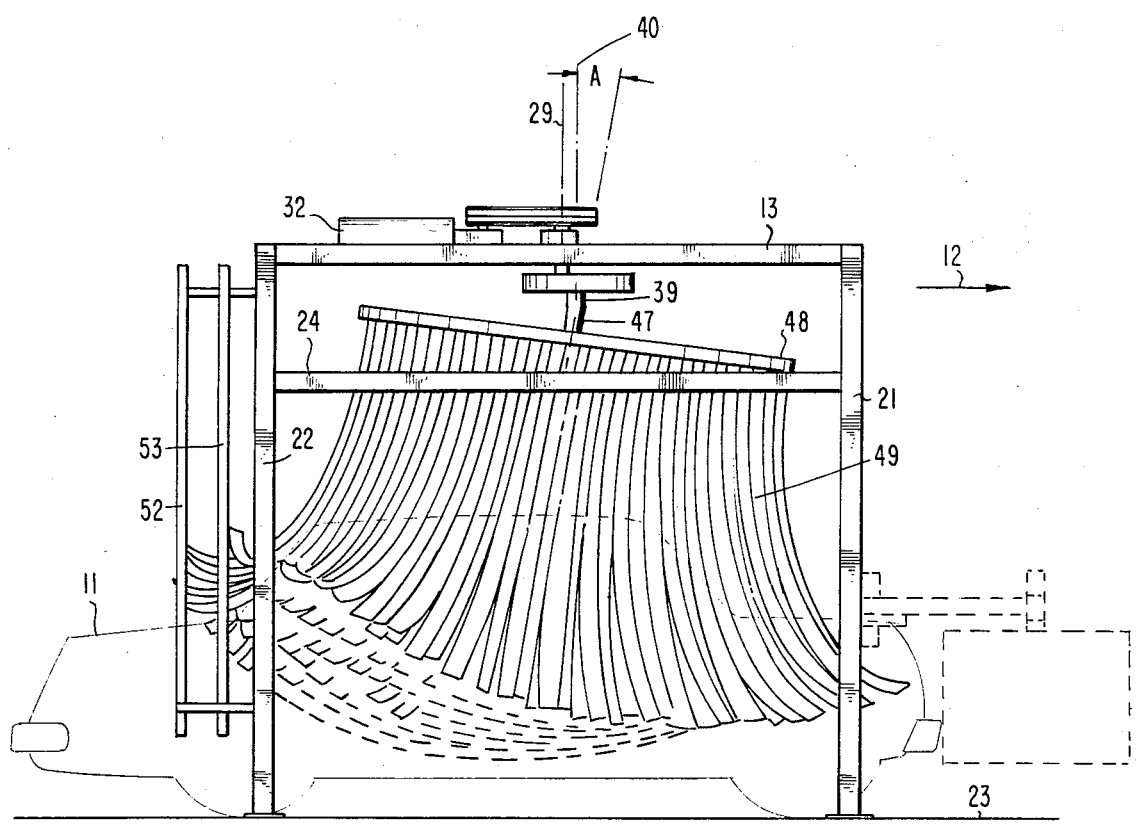
FIG. 2 is a side elevational view thereof.

Referring now to the drawings and in particular FIG. 1, the automobile 11 has entered the scrubbing apparatus in the direction of arrow 12. The apparatus itself includes an overhead frame having upper side members 13 and cross members 14 at the top connected to posts 21 at the front or exit corners, and connected to posts 22 at the rear or entrance corners. A spider or center beam structure 16 includes the longitudinal members 17 and lateral members 18, the former being connected to the top cross members 14 and the latter being connected to the top side members 13, at their outer ends, all four of these members being connected to a hub 19. As shown in the side view of FIG. 2, the corner posts 21 at the front and 22 at the rear support the overhead frame above the floor 23. Intermediate side members are provided at 24 and the same construction is used at the front and rear, although it is not shown in the drawings herein.

A main drive shaft 26 is supported in the hub 19 and extends downwardly through it and has a nut 27 threaded onto the lower end 28 of the main shaft. This shaft is rotatably mounted for rotation on the vertical axis 29 centered over the path of the vehicle through the apparatus.

Shaft 26 has a pulley 31 secured near its upper end. A drive motor 32 and reduction gear box 33 are secured to the frame member 17. The great box has a pulley 34 on its output shaft. A drive belt 36 runs on the pulleys 31 and 34, whereby the motor can drive shaft 26 about the vertical axis 29.

Figure 3:
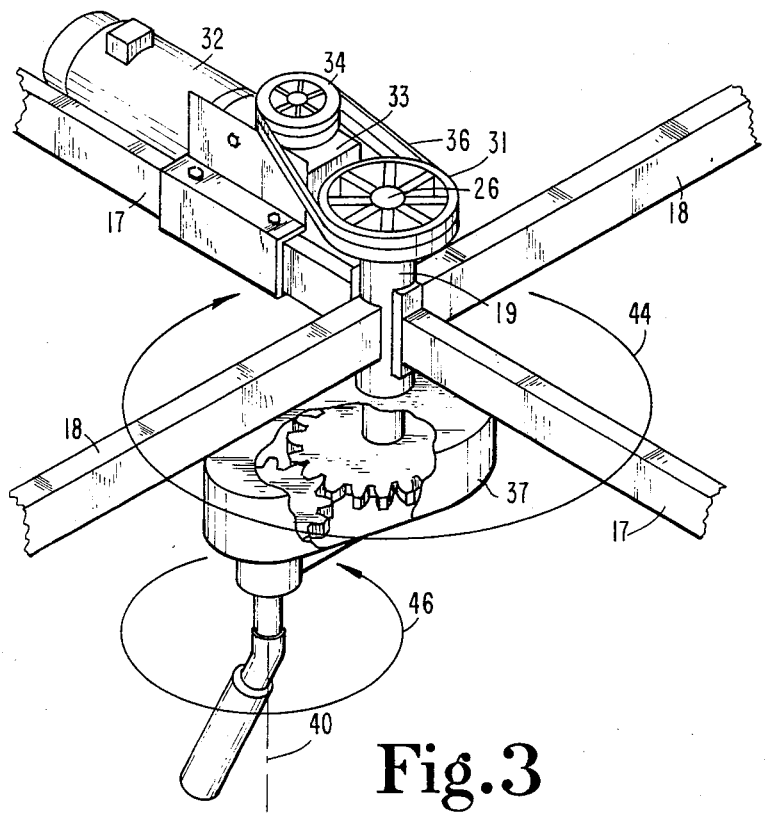
FIG. 3 is a fragmentary pictorial view of an enlarged scale with a portion cut away, and showing the drive mechanism.
Figure 4:
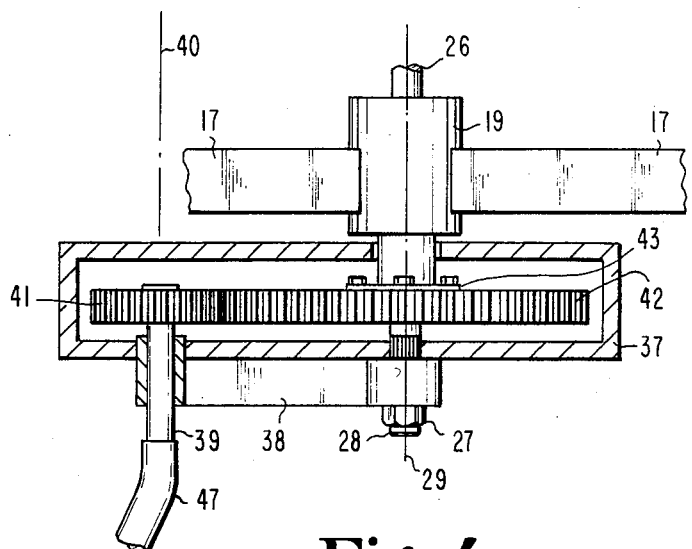
FIG. 4 is an enlarged fragmentary elevational view, partially in section.

A gear housing 37 is secured to or has an arm 38 as an integral portion thereof. This arm is splined or keyed to the lower end of shaft 26 so that it rotates with the shaft. The arm and housing serve as a bearing support for a second shaft 39 which is rotatable in the housing. It has a gear 41 secured to the upper end of it. This gear meshes with a stationary gear 42 secured to the flange 43 of the hub 19. Consequently, as the motor 32 drives shaft 26, arm and housing 37 in one rotational direction, such as clockwise direction 44 in FIG. 3, shaft 39 will be drive counterclockwise per arrow 46 in FIG. 3. It may be observed that the housing is shown in different index positions in FIGS. 2, 3 and 4, the position in FIG. 2 being essentially the same as in FIG. 1. Thus, the axis 40 for shaft 39 is shown in different positions in these different figures. This emphasizes the fact that the shaft 39 moves in a circle about the main shaft axis 29. There is an angled extension 47 on shaft 39 and it is disposed at an angle A with respect to the axis 40 which is 15°.

A circular frame 48 is rotatably mounted to this angled portion of 47 of the shaft 39. Flexible fabric strips 49 are hung from the four circular rails or rings and the 12 radial spokes of this circular frame. This provides a sort of solid cylindrical curtain of fabric strips. So the frame 48 may be referred to as a strip support frame or curtain hanger frame. The fabric strips are of a length sufficient that the bottom end of the lowermost strip when the assembly is at rest (such as the strip at the front of the frame in FIG. 2 when the unit is at rest with no vehicle present) is approximately six inches above the floor 23.

In operation, as the vehicle enters the assembly, it is sprayed by water from jets in the pre-rinse spray pipes 52 at each side and across the top at the entrance. It is sprinkled by soap from the soap foamer pipes 53 at each side and across the top at the entrance. This is for a version of the apparatus in which the vehicle is moved through it in the one direction of the arrow 12. The apparatus can be arranged readily for entry in that direction, scrubbing while moving through, and backing out. It is just a matter of locating rinsing pipes at the exit for the first version, or at the entrance with the pre-rinse pipes, for the latter version.

As the vehicle is moved in, the shaft 26 is belt driven by the motor 32. The curtain hanger frame 48 is moved generally in a path shown by the circle 51 (FIG. 1). As it does so, the strips begin to operate on the front end of the vehicle. As the vehicle is moved through, either slowly under its own power, or by being pulled through with a floor conveyor (the more typical way to do it), the unit will continue to scrub the front, top, sides and finally will scrub the rear as the vehicle moves out. During the operation, as the arm with gear housing is rotated in a clockwise direction as viewed from above, the curtain hanger frame is moved in that direction but is rotated in a counterclockwise direction due to the gear action. At the same time, since it is offset-mounted and free to rotate at will upon the end of the inclined shaft portion 47, the strips will move up and down on the front and sides of the vehicle as the vehicle moves through and the arm swings the scrubbing unit around. Therefore, a positive vertical scrubbing action is obtained. This action, and complete scrubbing of the front, sides, rear and upwardly-facing horizontal surfaces can be obtained for a vehicle while parked in the space under the overhead frame but, due to the difference between the diameter of the scrubbing unit and the length of the vehicle, either the vehicle will have to be moved through far enough that both ends get scrubbed, or a couple of units may be positioned in tandem to thoroughly scrub a vehicle while parked. Rinsing of the vehicle can be accomplished during departure from the front or rear of the apparatus, depending upon how it is situated on the site.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. Vehicle scrubbing apparatus comprising:
   means for supporting a vehicle to be scrubbed;
   overhead support means;
   curtain hanger means mounted to said overhead support means;
   vehicle wiping means suspended from said hanger means; and
   hanger drive means coupled to said hanger means and to said overhead support means and operable, when actuated, to move said hanger means in a circular path about a first substantially vertical axis, said hanger means being rotatable about an axis inclined with respect to said vertical axis.
2. The vehicle scrubbing apparatus of claim 1 and wherein said drive means include:
   first drive shaft means having its axis on said first axis;
   drive arm means having a proximal portion secured to said first shaft means at said first axis and having a distal portion; and
   second shaft means having a proximal portion rotatably mounted to said arm means at said distal portion of said arm means to rotate on a second axis parallel to said first axis and horizontally spaced from said first axis;
   said second shaft means having a distal portion offset with respect to said second axis;
   said hanger means being rotatably mounted to said distal portion of said second shaft means.
3. The apparatus of claim 2 wherein said drive means further include:
   a first gear fixed to said overhead support means and a second gear fixed to the proximal portion of said second shaft means, said first and second gears being in driving engagement with each other whereby the rotation of said arm means in one rotational direction about said first axis causes rotation of said second shaft means in the opposite rotational direction on said second axis as said second shaft means is moved in a circular path about said first axis in said one rotational direction.
4. The apparatus of claim 3 wherein:
   said rotatable mounting of said hanger means to said distal portion of said second shaft means has its rotational axis inclined at an angle of 15 degrees with respect to said second axis.
5. The apparatus of claim 4 wherein:
   said curtain hanger means include an array of concentric rings, and spokes extending radially from the center of the rings and attached thereto, said wiping means being fabric strips hanging from at least some of said rings.
6. The apparatus of claim 4 and wherein:
   at least some of said strips hang to a level approximately 6 inches from the said vehicle supporting means.
7. The apparatus of claim 6 and wherein:
   said curtain hanger means is of a diameter greater than the width of the vehicle to be scrubbed.
8. A method of scrubbing a vehicle and comprising the steps of:
   moving a vehicle through a curtain of flexible strips, with the strips in contact with exterior surfaces of the vehicle;
   moving the strips in a generally circular path around the vehicle while moving the strips in a second circular path within the first path; and
   positioning the anchor points of the strips in a constantly moving inclined plane with respect to the axis of the second circular path.

* * * * *